(12) United States Patent
Yoshioka et al.

(10) Patent No.: US 10,601,073 B2
(45) Date of Patent: Mar. 24, 2020

(54) SOLID ELECTROLYTE, ALL SOLID STATE BATTERY, METHOD FOR PRODUCING SOLID ELECTROLYTE, AND METHOD FOR PRODUCING ALL SOLID STATE BATTERY

(71) Applicant: Murata Manufacturing Co., Ltd., Nagaokakyo-shi, Kyoto-fu (JP)

(72) Inventors: Makoto Yoshioka, Nagaokakyo (JP); Akisuke Ito, Nagaokakyo (JP); Ryohei Takano, Nagaokakyo (JP); Takeo Ishikura, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 16/121,835

(22) Filed: Sep. 5, 2018

(65) Prior Publication Data

US 2019/0067736 A1  Feb. 28, 2019

Related U.S. Application Data

(63) Continuation of application No. PCT/JP2017/009056, filed on Mar. 7, 2017.

(30) Foreign Application Priority Data

Mar. 8, 2016  (JP) .................................. 2016-044362

(51) Int. Cl.
*H01M 6/16* (2006.01)
*H01M 10/0562* (2010.01)
(Continued)

(52) U.S. Cl.
CPC ......... *H01M 10/0562* (2013.01); *C01B 25/45* (2013.01); *H01B 1/08* (2013.01);
(Continued)

(58) Field of Classification Search
CPC ............. H01M 10/0562; H01M 4/382; H01M 2300/0074
See application file for complete search history.

(56) References Cited

U.S. PATENT DOCUMENTS 5,580,430 A * 12/1996 Balagopal ............ B01J 19/2475
204/252
8,859,141 B2  10/2014 Boxley et al.
(Continued)

FOREIGN PATENT DOCUMENTS

| CN | 101969110 A | 2/2011 |
| CN | 102760884 A | 10/2012 |

(Continued)

OTHER PUBLICATIONS

International Search Report issued for PCT/JP2017/009056, dated Apr. 11, 2017.
(Continued)

*Primary Examiner* — Jane J Rhee
(74) *Attorney, Agent, or Firm* — Arent Fox LLP

(57) ABSTRACT

A solid electrolyte having a NaSICON-type crystal structure and represented by a general formula $Li_{1+a}Zr_{2-b}M_c(PO_4)_3$. In the general formula, Li may be partially substituted with at least one selected from the group consisting of Na, K, Rb, Cs, Ag, and Ca, P may be partially substituted with at least one of B and Si, M contains at least one first element capable of stabilizing or partially stabilizing the tetragonal or cubic crystal structure of a high-temperature phase of $ZrO_2$, $-0.50 \leq a \leq 2.00$, $0.01 \leq b \leq 1.90$, and $0.01 \leq c \leq 1.90$.

5 Claims, 4 Drawing Sheets

(51) Int. Cl.
*H01B 1/08* (2006.01)
*H01M 10/0585* (2010.01)
*C01B 25/45* (2006.01)
*H01M 4/38* (2006.01)

(52) U.S. Cl.
CPC ....... *H01M 4/382* (2013.01); *H01M 10/0585* (2013.01); *H01M 2300/0074* (2013.01)

(56) References Cited

U.S. PATENT DOCUMENTS

| | | | |
|---|---|---|---|
| 9,236,770 | B2 | 2/2016 | Boxley et al. |
| 9,484,596 | B2 | 11/2016 | Otomo et al. |
| 2011/0104526 | A1 | 5/2011 | Boxley et al. |
| 2014/0363706 | A1 | 12/2014 | Boxley et al. |
| 2015/0147597 | A1 | 5/2015 | Otomo et al. |

FOREIGN PATENT DOCUMENTS

| | | |
|---|---|---|
| EP | 2985817 A1 | 2/2016 |
| JP | H02250264 A | 10/1990 |
| JP | 2013510391 A | 3/2013 |
| JP | 2014002966 A | 1/2014 |
| JP | 2015065021 A | 4/2015 |
| JP | 2015065022 A | 4/2015 |
| JP | 2015065023 A | 4/2015 |
| JP | 2015076324 A | 4/2015 |
| WO | 2015144074 A1 | 10/2015 |

OTHER PUBLICATIONS

Written Opinion of the International Searching Authority issued for PCT/JP2017/009056, dated Apr. 11, 2017.

Hui Xie et al.; "$Li_{1.2}Zr_{1.9}Ca_{0.1}(PO_4)_3$, a room-temperature Li-ion solid electrolyte"; Journal of Power Sources, vol. 196, No. 18, May 6, 2011, pp. 7760-7762.

Takahito Suzuki et al.; "Structure refinement of lithium ion conductors $Li_3Sc_2(PO_4)_3$ and $Li_{3-2}(Sc_{1-x}M_x)_2(PO_4)_3$ (M=Ti, Zr) with x = 0.10 by neutron diffraction"; Solid State Ionics, vol. 113-115, Dec. 1, 2018, pp. 89-96.

Y. Saito et al.; Grain-boundary ionic conductivity in nominal $Li_{1+x}M_xTi_{2-x}(PO_4)_3$ (M=$Sc^{3+}$ or $Y^{3+}$) and their zirconium analogues; Journal of Materials Science Letters, vol. 11, Jan. 31, 1992, pp. 888-890.

* cited by examiner

Comparative Example 1

Example 1

US 10,601,073 B2

SOLID ELECTROLYTE, ALL SOLID STATE BATTERY, METHOD FOR PRODUCING SOLID ELECTROLYTE, AND METHOD FOR PRODUCING ALL SOLID STATE BATTERY

CROSS REFERENCE TO RELATED APPLICATIONS

The present application is a continuation of International application No. PCT/JP2017/009056, filed Mar. 7, 2017, which claims priority to Japanese Patent Application No. 2016-044362, filed Mar. 8, 2016, the entire contents of each of which are incorporated herein by reference.

FIELD OF THE INVENTION

The present invention relates to a solid electrolyte, an all solid state battery, a method for producing a solid electrolyte, and a method for producing an all solid state battery.

BACKGROUND OF THE INVENTION

Conventionally, all solid state batteries are known as secondary batteries which are excellent in reliability and safety. For example, Patent Document 1 discloses an all solid state battery that has an electrolyte film composed of a NaSICON-type film. In addition, Patent Document 2 discloses a lithium ion conductive solid electrolyte represented by the chemical formula $Li_{1+x}M_xZr_{2-x}(PO_4)_3$. In the formula, M represents at least one element selected from Al and rare-earth elements, and x represents 0.1 to 1.9.

Patent Document 1: Published Japanese Translation of PCT International Application No. 2013-510391

Patent Document 2: Japanese Patent Application Laid-Open No. 2-250264

SUMMARY OF THE INVENTION

In all solid state batteries, there is a demand for improving the ionic conductivity of solid electrolyte layers and improving the battery characteristics of the all solid state batteries.

A main object of the present invention is to improve the ionic conductivity of a solid electrolyte layer, and improve the battery characteristics of an all solid state battery.

A solid electrolyte according to an aspect of the present invention has a NaSICON-type crystal structure. The solid electrolyte is represented by a general formula $Li_{1+a}Zr_{2-b}M_c(PO_4)_3$ (where Li may be partially substituted with at least one selected from the group consisting of Na, K, Rb, Cs, Ag, and Ca, P may be partially substituted with at least one of B and Si, and M contains at least one first element capable of stabilizing or partially stabilizing the tetragonal or cubic crystal structure of a high-temperature phase of $ZrO_2$, and $-0.50 \leq a \leq 2.00$, $0.01 \leq b \leq 1.90$, and $0.01 \leq c \leq 1.90$.

The use of the solid electrolyte according to the present invention can achieve a solid electrolyte layer which has a high ion conductivity. Accordingly, an all solid state battery can be achieved which has excellent battery characteristics.

In the solid electrolyte, the M preferably contains at least one selected from the group consisting of Y, Ca, Mg, Sc, and lanthanoid elements, as the at least one first element capable of stabilizing or partially stabilizing the tetragonal or cubic crystal structure of the high-temperature phase of $ZrO_2$.

Most preferably, the M preferably contains at least one selected from the group consisting of Y, Ca, and Mg, as the at least one first element capable of stabilizing or partially stabilizing the tetragonal or cubic crystal structure of the high-temperature phase of $ZrO_2$.

In the solid electrolyte according to the present invention, c preferably meets $0.01 \leq c \leq 0.38$ in the general formula.

In the solid electrolyte according to the present invention, c most preferably meets $0.02 \leq c \leq 0.20$ in the general formula.

In the solid electrolyte according to the present invention, M preferably further contains at least one second element selected from the group consisting of Al, Ga, Sc, In, Ge, Ti, Ru, Sn, Hf, Ce, V, Nb, Ta, Bi, and W.

The solid electrolyte according to a further aspect of the present invention is preferably a solid electrolyte represented by the general formula $Li_{1+a}Zr_{2-b}M1_{c1}M2_{c2}(PO_4)_3$ (where Li may be partially substituted with at least one selected from the group consisting of Na, K, Rb, Cs, Ag, and Ca, P may be partially substituted with at least one of B and Si, M1 represents at least one element capable of stabilizing or partially stabilizing the tetragonal or cubic crystal structure of the high-temperature phase of $ZrO_2$, M2 represents at least one element selected from the group consisting of Al, Ga, Sc, In, Ge, Ti, Ru, Sn, Hf, Ce, V, Nb, Ta, Bi, and W, and $-0.50 \leq a \leq 2.00$, $0.01 \leq b \leq 1.90$, $0.01 \leq c1 \leq 0.90$, and $0.01 \leq c2 \leq 1.89$).

An all solid state battery according to the present invention includes a solid electrolyte layer, a positive electrode, and a negative electrode. The solid electrolyte layer includes the solid electrolyte according to the present invention. The positive electrode is joined by sintering to one surface of the solid electrolyte layer. The negative electrode is joined by sintering to the other surface of the solid electrolyte layer.

In a method for producing a solid electrolyte according to the present invention, a solid electrolyte is synthesized by using stabilized or partially stabilized zirconia. Synthesizing a solid electrolyte by using the partially stabilized zirconia can produce a solid electrolyte capable of forming a solid electrolyte layer with a high ion conductivity.

In the method for producing a solid electrolyte according to the present invention, the solid electrolyte is preferably synthesized by using partially stabilized zirconia partially stabilized with at least one element selected from the group consisting of Y, Ca, Mg, Sc and a lanthanoid element.

In the method for producing a solid electrolyte according to the present invention, the solid electrolyte is preferably synthesized by using stabilized zirconia stabilized with, or partially stabilized zirconia partially stabilized with at least one element selected from the group consisting of Y, Ca, and Mg.

In a method for producing an all solid state battery according to the present invention, an all solid state battery is obtained by joining a solid electrolyte layer including the solid electrolyte produced by using the method for producing a solid electrolyte according to the present invention, and an electrode by sintering.

According to the present invention, it is possible to improve the ionic conductivity of the solid electrolyte layer, and improve the battery characteristics of the all solid state battery.

DETAILED DESCRIPTION OF THE INVENTION

Figure 1:
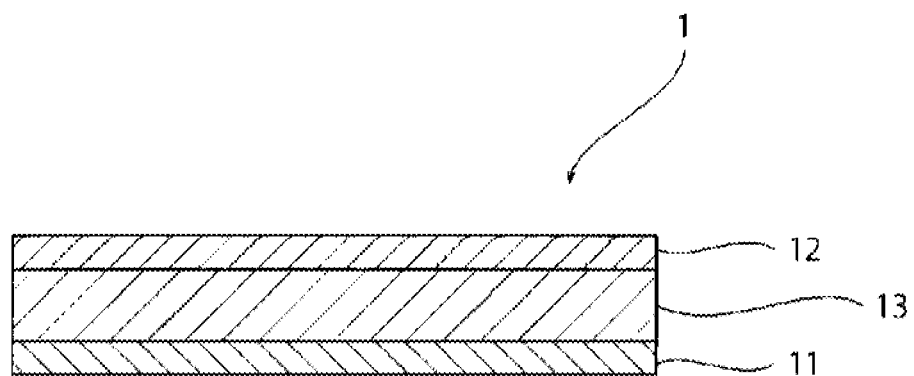
FIG. 1 is a schematic cross-sectional view of an all solid state battery according to one embodiment of the present invention.

An example of a preferred embodiment of the present invention will be described below. However, the following embodiment is considered by way of example only. The present invention is not limited to the following embodiment in any way.

In addition, members that have substantially the same functions shall be denoted by the same reference symbols in the respective drawings referred to in the embodiment and the like. In addition, the drawings referenced in the embodiment and the like are schematically made. The ratios between the dimensions of objects drawn in the drawings, and the like may, in some cases, differ from the ratios between the dimensions of actual objects, or the like.

The dimensional ratios of objects, and the like may differ between the drawings as well in some cases. The specific dimensional ratios of objects, and the like should be determined in view of the following description.

FIG. 1 is a schematic cross-sectional view of an all solid state battery 1 according to the preset embodiment. As shown in FIG. 1, the battery includes a negative electrode 12, a positive electrode 11, and a solid electrolyte layer 13.

The positive electrode 11 includes positive electrode active material particles. Examples of the positive electrode active material particles preferably used include lithium-containing phosphate compound particles which have a NASICON-type structure, lithium-containing phosphate compound particles which have an olivine-type structure, lithium-containing layered oxide particles, lithium-containing oxide particles which have a spinel-type structure. Specific examples of the preferably used lithium-containing phosphate compound which has a NASICON-type structure include $Li_3V_2(PO_4)_3$. Specific examples of the preferably used lithium-containing phosphate compound which has an olivine-type structure include $LiFePO_4$ and $LiMnPO_4$. Specific examples of the preferably used lithium-containing layered oxide particles include $LiCoO_2$ and $LiCo_{1/3}Ni_{1/3}Mn_{1/3}O_2$. Specific examples of the preferably used lithium-containing oxide which has a spinel-type structure include $LiMn_2O_4$ and $LiNi_{0.5}Mn_{1.5}O_4$. Only one of these positive electrode active material particles may be used, or two or more thereof may be used in mixture.

The positive electrode 11 may further include a solid electrolyte. The type of solid electrolyte included in the positive electrode 11 is not particularly limited, but it is preferable to include the same type of solid electrolyte as the solid electrolyte included in the solid electrolyte layer 13.

The negative electrode 12 includes negative electrode active material particles. Specific examples of the negative electrode active material particles preferably used include compound particles represented by $MO_x$ (M is at least one selected from the group consisting of Ti, Si, Sn, Cr, Fe, Nb and Mo. $0.9 \leq X \leq 2.5$), graphite-lithium compound particles, lithium alloy particles, lithium-containing phosphate compound particles which have a NASICON-type structure, lithium-containing phosphate compound particles which have an olivine-type structure, and lithium-containing oxide particles which have a spinel-type structure. Specific examples of the lithium alloy preferably used include Li—Al alloys. Specific examples of the preferably used lithium-containing phosphate compound which has an olivine-type structure include $Li_3Fe_2(PO_4)_3$. Specific examples of the preferably used lithium-containing oxide which has a spinel-type structure include $Li_4Ti_5O_{12}$.

Only one of these negative electrode active material particles may be used, or two or more thereof may be used in mixture.

The negative electrode 12 may further include a solid electrolyte. The type of solid electrolyte included in the negative electrode 12 is not particularly limited, but it is preferable to include the same type of solid electrolyte as the solid electrolyte included in the solid electrolyte layer 13.

A solid electrolyte layer 13 is disposed between the positive electrode 11 and the negative electrode 12. More specifically, the positive electrode 11 is disposed on one side of the solid electrolyte layer 13, and the negative electrode 12 is disposed on the other side. Each of the positive electrode 11 and the negative electrode 12 is bonded by sintering to the solid electrolyte layer 13. More specifically, the positive electrode 11, the solid electrolyte layer 13, and the negative electrode 12 constitute an integrally sintered body.

The solid electrolyte layer 13 has a NaSICON-type crystal structure. The solid electrolyte layer 13 includes a solid electrolyte represented by a general formula $Li_{1+a}Zr_{2-b}M_c(PO_4)_3$. In the formula, Li may be partially substituted with at least one selected from the group consisting of Na, K, Rb, Cs, Ag, and Ca, P may be partially substituted with at least one of B and Si, and M contains at least one element capable of stabilizing or partially stabilizing the tetragonal or cubic crystal structure of the high-temperature phase of $ZrO_2$, and $-0.50 \leq a \leq 2.00$, $0.01 \leq b \leq 1.90$, and $0.01 \leq c \leq 1.90$. Therefore, the solid electrolyte layer 13 has high ion conductivity. Accordingly, the all solid state battery 1 with the solid electrolyte layer 13 has excellent battery characteristics such as a power density. The reason therefor is not known exactly, but believed to be because the addition of M makes a high ionic conduction phase more likely to be formed in the solid electrolyte. However, the excessively high content of M in the solid electrolyte is believed to produce M that fails to serve as a solid solution in the NaSICON-type solid electrolyte, thereby causing the M to form a different phase, and thus decreasing the ion conductivity. Accordingly, in the general formula mentioned above, c preferably meets $0.01 \leq c \leq 0.38$, more preferably $0.02 \leq c \leq 0.20$.

Specific examples of preferable M include, for example, lanthanoid elements such as Y, Ca, Mg, Sc, and Ce. Above all, from the viewpoint of achieving a higher ionic conductivity, M is preferably at least one selected from the group consisting of Y, Ca, Mg, Sc, and lanthanoid elements. The reason why a high ionic conductivity can be achieved by using Y, Ca, or Mg as M is not known exactly, but believed to be because a high ionic conduction phase is made more likely to be formed and maintained.

M in the general formula mentioned above preferably further contains another element for maintaining the NaSICON-type crystal structure even in the case of substitution with Zr of the general formula. Specifically, M in the general formula preferably further contains at least one element selected from the group consisting of Al, Ga, Sc, In, Ge, Ti, Ru, Sn, Hf, Ce, V, Nb, Ta, Bi, and W. This is because, in this case, the ionic conductivity of the solid electrolyte can be further increased. The reason therefor is not known exactly, but believed to be because the high ionic conduction phase is made much more likely to be formed.

Specifically, the solid electrolyte according to the present invention is preferably a solid electrolyte represented by the general formula $Li_{1+a}Zr_{2-b}M1_{c1}M2_{c2}(PO_4)_3$ (Li may be partially substituted with at least one selected from the group consisting of Na, K, Rb, Cs, Ag, and Ca, P may be partially substituted with at least one of B and Si, M1 represents at least one element capable of stabilizing or partially stabilizing the tetragonal or cubic crystal structure of the high-temperature phase of $ZrO_2$, M2 represents at least one element selected from the group consisting of Al, Ga, Sc, In, Ge, Ti, Ru, Sn, Hf, Ce, V, Nb, Ta, Bi, and W, and $-0.50 \leq a \leq 2.00$, $0.01 \leq b \leq 1.90$, $0.01 \leq c1 \leq 0.90$, and $0.01 \leq c2 \leq 1.89$). From the viewpoint of forming a NaSICON-type crystal structure, c1 preferably meets $0.01 \leq c1 \leq 0.90$, and more preferably $0.01 \leq c1 \leq 0.60$. Likewise, from the viewpoint of forming a NaSICON-type crystal structure, c2 preferably meets $0.01 \leq c2 \leq 1.89$, and more preferably $0.01 \leq c2 \leq 1.79$.

In the general formula, Li may be partially substituted with at least one selected from the group consisting of Na, K, Rb, Cs, Ag, and Ca. In that case, the molar ratio of at least one selected from the group consisting of Na, K, Rb, Cs, Ag, and Ca to Li ((Li)/(at least one selected from the group consisting of Na, K, Rb, Cs, Ag, and Ca) is preferably 1 or more and 289 or less, and more preferably 5 or more and 150 or less.

In the general formula, P may be partially substituted with at least one of B and Si. In that case, the molar ratio of at least one of B and Si to P ((at least one of B and Si)/(P)) is preferably 0.0 or more and 2.0 or less, and more preferably 0.0 or more and 0.5 or less.

From the viewpoint of achieving a higher ionic conductivity, a preferably meets $-0.15 \leq a \leq 0.70$, and more preferably $-0.10 \leq a \leq 0.50$. b preferably meets $0.01 \leq b \leq 1.60$, and more preferably $0.01 \leq b \leq 1.00$.

The compound represented by the general formula has 12 oxygen atoms, but the number of oxygen atoms included in the compound represented by the general formula does not have to be strictly 12 from the viewpoint of maintaining the neutrality between positive charge and negative charge. In the present invention, the compound represented by the general formula $Li_{1+x}Zr_{2+y}M\alpha_zM\beta_w(PO_4)_3$ is considered to include compounds containing 7 mol or more and 15 mol or less of oxygen.

(Method for Producing Solid Electrolyte)

Next, an example of a method for producing a solid electrolyte will be described.

First, a raw material as a Li source, a raw material as a Zr source, a raw material as a M source, and a raw material as a P source are weighed in desired proportions, and mixed. The obtained mixed powder is subjected to calcination, thereby preparing a calcined body. The obtained calcined body is subjected to firing, thereby making it possible to obtain a solid electrolyte. According to the present embodiment, as the Zr source, partially stabilized zirconia is used which is partially stabilized by an element contained in M, capable of stabilizing or partially stabilizing the tetragonal or cubic crystal structure of the high-temperature phase of $ZrO_2$. For this reason, a solid electrolyte can be produced which has a high ion conductivity. The reason therefor is not known exactly, but believed to be because the use of, as the Zr source, a zirconium oxide containing in advance an element capable of stabilizing or partially stabilizing the tetragonal or cubic crystal structure of the high-temperature phase of $ZrO_2$ makes a different phase unlikely to be generated, thereby making a high ionic conduction phase likely to be formed.

The content of the element capable of stabilizing or partially stabilizing the tetragonal or cubic crystal structure of the high-temperature phase of $ZrO_2$ in the partially stabilized zirconia for use as the Zr source is, with respect to the content of Zr, preferably 0.01 mol % or more and 20.0 mol % or less, more preferably 0.10 mol % or more and 15.0 mol % or less, and still more preferably 1.00 mol % or more and 10.0 mol % or less.

(Method for Producing all Solid State Battery 1)

Next, an example of a method for producing the all solid state battery 1 will be described.

First, a paste is prepared by appropriately mixing the active material particles and the solid electrolyte with a solvent, a resin, and the like. The paste is applied onto a sheet, and dried to form a first green sheet for constituting the positive electrode 11. Likewise, a second green sheet for constituting the negative electrode 12 is formed.

A paste is prepared by appropriately mixing the solid electrolyte with a solvent, a resin, and the like. The paste is applied and dried to prepare a third green sheet for constituting the solid electrolyte layer 13.

Next, the first to third green sheets are appropriately stacked to prepare a stacked body. The prepared stacked body may be pressed. Preferred pressing methods include isostatic press.

Thereafter, the stacked body is subjected to sintering, thereby making it possible to obtain the all solid state battery 1.

Hereinafter, the present invention will be described in more detail, based on specific examples, but the present invention is not to be considered limited to the following examples in any way, and can be worked with changes appropriately made without changing the scope of the invention.

Comparative Example 1 and Examples 1 to 25

Solid electrolytes represented by the general formula $Li_{1+a}Zr_{2-b}M1_{c1}M2_{c2}(PO_4)_3$ (Li may be partially substituted with at least one selected from the group consisting of Na, K, Rb, Cs, Ag, and Ca, P may be partially substituted with at least one of B and Si, M1 represents at least one element capable of stabilizing or partially stabilizing the tetragonal or cubic crystal structure of the high-temperature phase of $ZrO_2$, M2 represents at least one element selected from the group consisting of Al, Ga, Sc, In, Ge, Ti, Ru, Sn, Hf, Ce, V, Nb, Ta, Bi, and W, and $-0.50 \leq a \leq 2.00$, $0.01 \leq b \leq 1.90$, $0.01 \leq c1 \leq 0.90$, and $0.01 \leq c2 \leq 1.89$) were synthesized by the production method described in the embodiment mentioned above.

Comparative Example 1

Raw materials including lithium carbonate ($Li_2CO_3$), zirconium oxide ($ZrO_2$), and ammonium dihydrogen phosphate ($NH_4H_2PO_4$) were weighed so as to have the composition shown in Table 1 below. Next, the weighed raw material powder was encapsulated in a 500 ml polyethylene pot made of polyethylene, and rotated at 150 rpm for 16 hours on a pot rack to mix the raw materials. Next, the raw materials were subjected to firing under an air atmosphere at 500° C. for 1 hour and at 800° C. for 6 hours to remove volatile components. Next, the fired product obtained was encapsulated in a 500 ml polyethylene pot made of polyethylene together with water and φ 5 mm cobblestones, and subjected to grinding by rotation at 150 rpm for 16 hours on a pot rack. Thereafter, the product was placed on a hot plate at 120° C., and heated to remove moisture. The obtained pulverized material was subjected to firing under an air atmosphere at 900° C. to 1200° C. for 20 hours to obtain a powder of a solid electrolyte of the composition according to Comparative Example 1 as listed in Table 1.

Example 1

In the same way as in Comparative Example 1 except that raw materials including lithium carbonate ($Li_2CO_3$), zirconium oxide ($ZrO_2$), ammonium dihydrogen phosphate ($NH_4H_2P_4$), and yttrium oxide ($Y_2O_3$) were weighed as raw materials so as to have the composition shown in Table 1 below, a powder of a solid electrolyte was obtained.

Example 2

In the same way as in Comparative Example 1 except that raw materials including lithium carbonate ($Li_2CO_3$), zirconium oxide ($ZrO_2$), ammonium dihydrogen phosphate ($NH_4H_2PO_4$), and calcium oxide (CaO) were weighed as raw materials so as to have the composition shown in Table 1 below, a powder of a solid electrolyte was obtained.

Example 3

In the same way as in Comparative Example 1 except that raw materials including lithium carbonate ($Li_2CO_3$), zirconium oxide ($ZrO_2$), ammonium dihydrogen phosphate ($NH_4H_2PO_4$), and magnesium oxide (MgO) were weighed as raw materials so as to have the composition shown in Table 1 below, a powder of a solid electrolyte was obtained.

Example 4

In the same way as in Comparative Example 1 except that raw materials including lithium carbonate ($Li_2CO_3$), zirconium oxide ($ZrO_2$), ammonium dihydrogen phosphate ($NH_4H_2PO_4$), and scandium oxide ($Sc_2O_3$) were weighed as raw materials so as to have the composition shown in Table 1 below, a powder of a solid electrolyte was obtained.

Example 5

In the same way as in Comparative Example 1 except that raw materials including lithium carbonate ($Li_2CO_3$), zirconium oxide ($ZrO_2$), ammonium dihydrogen phosphate ($NH_4H_2PO_4$), and cerium oxide ($CeO_2$) were weighed as raw materials so as to have the composition shown in Table 1 below, a powder of a solid electrolyte was obtained.

Example 6

In the same way as in Comparative Example 1 except that without using zirconium oxide ($ZrO_2$), raw materials including yttrium-stabilized zirconia ($Y_{0.06}Zr_{1.94}O_{1.97}$), lithium carbonate ($Li_2CO_3$), and ammonium dihydrogen phosphate ($NH_4H_2PO_4$) were weighed as raw materials so as to have the composition shown in Table 1 below, a powder of a solid electrolyte was obtained.

Example 7

In the same way as in Comparative Example 1 except that without using zirconium oxide ($ZrO_2$), raw materials including calcium stabilized zirconia ($Ca_{0.06}Zr_{1.94}O_{1.94}$), lithium carbonate ($Li_2CO_3$), and ammonium dihydrogen phosphate ($NH_4H_2PO_4$) were weighed as raw materials so as to have the composition shown in Table 1 below, a powder of a solid electrolyte was obtained.

Example 8

In the same way as in Comparative Example 1 except that without using zirconium oxide ($ZrO_2$), raw materials including magnesium stabilized zirconia ($Mg_{0.08}Zr_{1.92}O_{1.92}$), lithium carbonate ($Li_2CO_3$), and ammonium dihydrogen phosphate ($NH_4H_2PO_4$) were weighed as raw materials so as to have the composition shown in Table 1 below, a powder of a solid electrolyte was obtained.

Example 9

Yttrium-stabilized zirconia with a molar ratio of Zr:Y=1.99:0.01 was synthesized using zirconium oxide ($ZrO_2$) and yttrium oxide ($Y_2O_3$) as raw materials. In the same way as in Comparative Example 1 except that raw materials including the yttrium stabilized zirconia and lithium carbonate ($Li_2CO_3$), and ammonium dihydrogen phosphate ($NH_4H_2PO_4$) were weighed so as to have the composition shown in Table 1 below, a powder of a solid electrolyte was obtained.

Example 10

Yttrium-stabilized zirconia with a molar ratio of Zr:Y=1.98:0.02 was synthesized using zirconium oxide ($ZrO_2$) and yttrium oxide ($Y_2O_3$) as raw materials. In the same way as in Comparative Example 1 except that raw materials including the yttrium stabilized zirconia and lithium carbonate ($Li_2CO_3$), and ammonium dihydrogen phosphate ($NH_4H_2PO_4$) were weighed so as to have the composition shown in Table 1 below, a powder of a solid electrolyte was obtained.

Example 11

Yttrium-stabilized zirconia with a molar ratio of Zr:Y=1.90:0.10 was synthesized using zirconium oxide ($ZrO_2$) and yttrium oxide ($Y_2O_3$) as raw materials. In the same way as in Comparative Example 1 except that raw materials including the yttrium stabilized zirconia and lithium carbonate ($Li_2CO_3$), and ammonium dihydrogen phosphate ($NH_4H_2PO_4$) were weighed so as to have the composition shown in Table 1 below, a powder of a solid electrolyte was obtained.

Example 12

Yttrium-stabilized zirconia with a molar ratio of Zr:Y=1.80:0.20 was synthesized using zirconium oxide ($ZrO_2$) and yttrium oxide ($Y_2O_3$) as raw materials. In the same way as in Comparative Example 1 except that raw materials including the yttrium stabilized zirconia and lithium carbonate ($Li_2CO_3$), and ammonium dihydrogen phosphate ($NH_4H_2PO_4$) were weighed so as to have the composition shown in Table 1 below, a powder of a solid electrolyte was obtained.

Example 13

Yttrium-stabilized zirconia with a molar ratio of Zr:Y=1.78:0.22 was synthesized using zirconium oxide ($ZrO_2$) and yttrium oxide ($Y_2O_3$) as raw materials. In the same way as in Comparative Example 1 except that raw materials including the yttrium stabilized zirconia and lithium carbonate ($Li_2CO_3$), and ammonium dihydrogen phosphate ($NH_4H_2PO_4$) were weighed so as to have the composition shown in Table 1 below, a powder of a solid electrolyte was obtained.

Example 14

Yttrium-stabilized zirconia with a molar ratio of Zr:Y=1.62:0.38 was synthesized using zirconium oxide ($ZrO_2$) and yttrium oxide ($Y_2O_3$) as raw materials. In the same way as in Comparative Example 1 except that raw materials including the yttrium stabilized zirconia and lithium carbonate ($Li_2CO_3$), and ammonium dihydrogen phosphate ($NH_4H_2PO_4$) were weighed so as to have the composition shown in Table 1 below, a powder of a solid electrolyte was obtained.

Example 15

Yttrium-stabilized zirconia with a molar ratio of Zr:Y=1.60:0.40 was synthesized using zirconium oxide ($ZrO_2$) and yttrium oxide ($Y_2O_3$) as raw materials. In the same way as in Comparative Example 1 except that raw materials including the yttrium stabilized zirconia and lithium carbonate ($Li_2CO_3$), and ammonium dihydrogen phosphate ($NH_4H_2PO_4$) were weighed so as to have the composition shown in Table 1 below, a powder of a solid electrolyte was obtained.

Example 16

Yttrium-stabilized zirconia with a molar ratio of Zr:Y=1.93:0.06 was synthesized using zirconium oxide ($ZrO_2$) and yttrium oxide ($Y_2O_3$) as raw materials. In the same way as in Comparative Example 1 except that raw materials including the yttrium stabilized zirconia and aluminum oxide ($Al_2O_3$), lithium carbonate ($Li_2CO_3$), and ammonium dihydrogen phosphate ($NH_4H_2PO_4$) were weighed so as to have the composition shown in Table 1 below, a powder of a solid electrolyte was obtained.

Example 17

Yttrium-stabilized zirconia with a molar ratio of Zr:Y=1.64:0.06 was synthesized using zirconium oxide ($ZrO_2$) and yttrium oxide ($Y_2O_3$) as raw materials. In the same way as in Comparative Example 1 except that raw materials including the yttrium stabilized zirconia and aluminum oxide ($Al_2O_3$), lithium carbonate ($Li_2CO_3$), and ammonium dihydrogen phosphate ($NH_4H_2PO_4$) were weighed so as to have the composition shown in Table 1 below, a powder of a solid electrolyte was obtained.

Example 18

Yttrium-stabilized zirconia with a molar ratio of Zr:Y=1.44:0.06 was synthesized using zirconium oxide ($ZrO_2$) and yttrium oxide ($Y_2O_3$) as raw materials. In the same way as in Comparative Example 1 except that raw materials including the yttrium stabilized zirconia and germanium oxide ($GeO_2$), lithium carbonate ($Li_2CO_3$), and ammonium dihydrogen phosphate ($NH_4H_2PO_4$) were weighed so as to have the composition shown in Table 1 below, a powder of a solid electrolyte was obtained.

Example 19

Yttrium-stabilized zirconia with a molar ratio of Zr:Y=1.97:0.03 was synthesized using zirconium oxide ($ZrO_2$) and yttrium oxide ($Y_2O_3$) as raw materials. In the same way as in Comparative Example 1 except that raw materials including the yttrium stabilized zirconia and titanium oxide ($TiO_2$), lithium carbonate ($Li_2CO_3$), and ammonium dihydrogen phosphate ($NH_4H_2PO_4$) were weighed so as to have the composition shown in Table 1 below, a powder of a solid electrolyte was obtained.

Example 20

Yttrium-stabilized zirconia with a molar ratio of Zr:Y=1.93:0.06 was synthesized using zirconium oxide ($ZrO_2$) and yttrium oxide ($Y_2O_3$) as raw materials. In the same way as in Comparative Example 1 except that raw materials including the yttrium stabilized zirconia and vanadium oxide ($V_2O_5$), lithium carbonate ($Li_2CO_3$), and ammonium dihydrogen phosphate ($NH_4H_2PO_4$) were weighed so as to have the composition shown in Table 1 below, a powder of a solid electrolyte was obtained.

Example 21

Yttrium-stabilized zirconia with a molar ratio of Zr:Y=1.07:0.03 was synthesized using zirconium oxide ($ZrO_2$) and yttrium oxide ($Y_2O_3$) as raw materials. In the same way as in Comparative Example 1 except that raw materials including the yttrium stabilized zirconia and aluminum oxide ($Al_2O_3$), germanium oxide ($GeO_2$), lithium carbonate ($Li_2CO_3$), and ammonium dihydrogen phosphate ($NH_4H_2PO_4$) were weighed so as to have the composition shown in Table 1 below, a powder of a solid electrolyte was obtained.

Example 22

Yttrium-stabilized zirconia with a molar ratio of Zr:Y=0.87:0.03 was synthesized using zirconium oxide ($ZrO_2$) and yttrium oxide ($Y_2O_3$) as raw materials. In the same way as in Comparative Example 1 except that raw materials including the yttrium stabilized zirconia and aluminum oxide ($Al_2O_3$), germanium oxide ($GeO_2$), titanium oxide ($TiO_2$), lithium carbonate ($Li_2CO_3$), and ammonium dihydrogen phosphate ($NH_4H_2PO_4$) were weighed so as to have the composition shown in Table 1 below, a powder of a solid electrolyte was obtained.

Example 23

Yttrium-stabilized zirconia with a molar ratio of Zr:Y=0.69:0.01 was synthesized using zirconium oxide ($ZrO_2$) and yttrium oxide ($Y_2O_3$) as raw materials. In the same way as in Comparative Example 1 except that raw materials including the yttrium stabilized zirconia and aluminum oxide ($Al_2O_3$), germanium oxide ($GeO_2$), titanium oxide ($TiO_2$), lithium carbonate ($Li_2CO_3$), and ammonium dihydrogen phosphate ($NH_4H_2PO_4$) were weighed so as to have the composition shown in Table 1 below, a powder of a solid electrolyte was obtained.

Example 24

Yttrium-stabilized zirconia with a molar ratio of Zr:Y=0.19:0.01 was synthesized using zirconium oxide ($ZrO_2$) and yttrium oxide ($Y_2O_3$) as raw materials. In the same way as in Comparative Example 1 except that raw materials including the yttrium stabilized zirconia and aluminum oxide ($Al_2O_3$), germanium oxide ($GeO_2$), titanium oxide ($TiO_2$), lithium carbonate ($Li_2CO_3$), and ammonium dihydrogen phosphate ($NH_4H_2PO_4$) were weighed so as to have the composition shown in Table 1 below, a powder of a solid electrolyte was obtained.

Example 25

Yttrium-stabilized zirconia with a molar ratio of Zr:Y=0.49:0.01 was synthesized using zirconium oxide ($ZrO_2$) and yttrium oxide ($Y_2O_3$) as raw materials. In the same way as in Comparative Example 1 except that raw materials including the yttrium stabilized zirconia and aluminum oxide ($Al_2O_3$), germanium oxide ($GeO_2$), titanium oxide ($TiO_2$), vanadium oxide ($V_2O_5$), lithium carbonate ($Li_2CO_3$), and ammonium dihydrogen phosphate ($NH_4H_2PO_4$) were weighed so as to have the composition shown in Table 1 below, a powder of a solid electrolyte was obtained.

(Evaluation of Crystal Structure of Solid Electrolyte)

The powders of the solid electrolytes prepared according to the respective Examples and Comparative Example 1 were subjected to XRD (X-ray diffractometer) measurement at 25° C., a scan rate of 4.0°/min, and an angle measurement range of 10° to 60°. The results are shown in FIG. 2.

Figure 2:
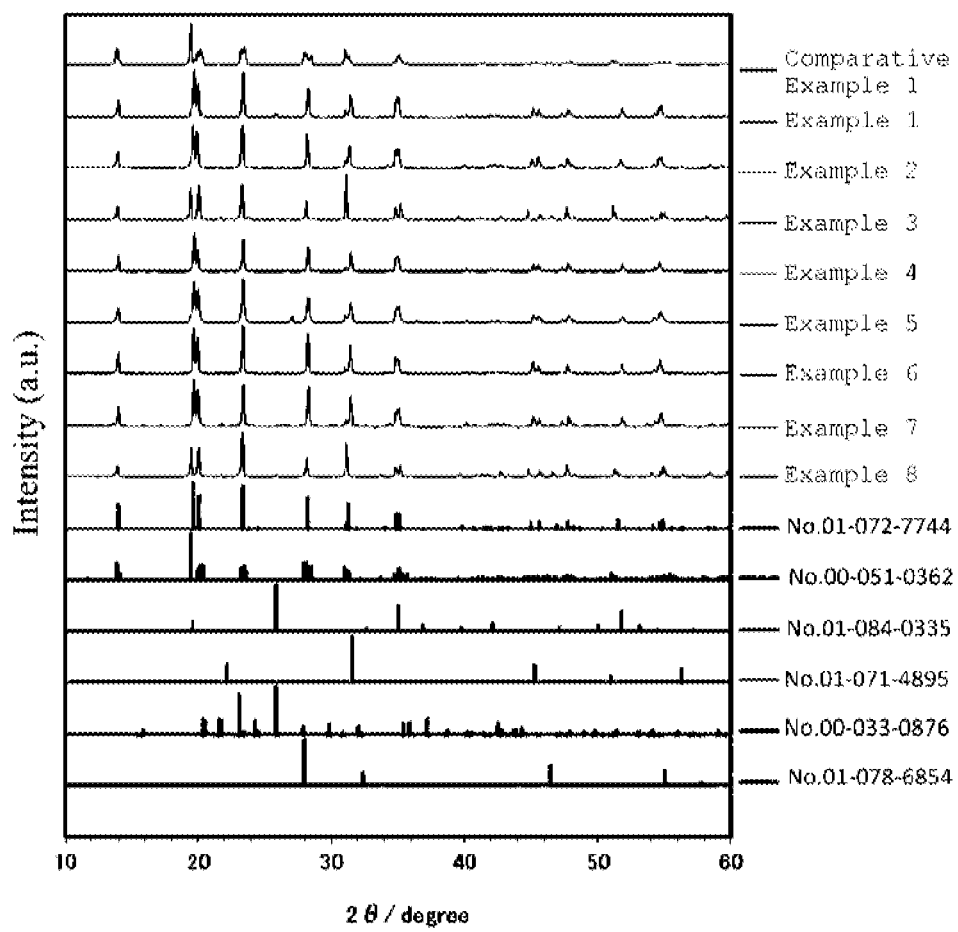
FIG. 2 is an X-ray diffraction chart for solid electrolyte layers prepared according to each of Examples 1 to 8 and Comparative Example 1.

It is to be noted that FIG. 2 shows therein together the pattern of JCPDS (Joint Committee on Powder Diffraction Standards) card (No. 01-072-7744) of Trigonal $LiZr_2(PO_4)_3$, the pattern of JCPDS card (No. 00-051-0362) of Triclinic $LiZr_2(PO_4)_3$, the pattern of JCPDS card (No. 01-084-0335) of Tetragonal $YPO_4$, the pattern of JCPDS card (No. 01-071-4895) of Cubic $Ca(ZrO_3)$, the pattern of JCPDS card (No. 00-033-0876) of Monoclinic $Mg_3(PO_4)_2$, and the pattern of JCPDS card (No. 01-078-6854) of Cubic $CeO_{1.866}$.

(Evaluation of Ionic Conductivity of Solid Electrolyte)

The ionic conductivity was measured as follows for the powders of the solid electrolytes prepared according to Examples 1 to 25 and Comparative Example 1.

First, sintered tablets were prepared in the following manner. First, the solid electrolyte, a butyral resin, and an alcohol were mixed thoroughly in proportions by mass of 98:15:140, and alcohol was then removed on a hot plate at 80° C., thereby providing a solid electrolyte powder coated with the butyral resin to serve as a binder. Next, the solid electrolyte powder was pressed at 90 MPa and molded into a tablet shape with the use of a tablet molding machine. After sandwiching the tablet between two porous setters, a sintered body was produced. The firing was performed by firing at a temperature of 500° C. in a nitrogen gas atmosphere containing 10% by volume of oxygen, thereby removing the butyral resin, and then firing at a temperature of 1000° C. to 1200° C. in an air atmosphere.

Next, the ion conductivity of the prepared sintered tablet was measured. Specifically, a platinum (Pt) layer to serve as a current collector layer was formed by sputtering on both sides of a sintered tablet, and the sintered tablet was then dried at 100° C. to remove moisture, and encapsulated with a 2032 type coin cell. The ion conductivity was calculated by measuring the alternating-current impedance with respect to the encapsulated cell. The alternating-current impedance measurement was, with the use of a frequency response analyzer (FRA) manufactured by Solartron, made under the conditions of frequency range: 0.1 to 1 MHz, amplitude: ±10 mV, and temperature: 25° C. The ionic conductivity σ was calculated from the following equation, with the resistance (the sum of the particle resistance and the grain boundary resistance) for each solid electrolyte from the cole-cole plot obtained by the alternating-current impedance measurement. The results are shown in Table 1. In Table 1, TG-LZP shows the pattern of the JCPDS card of Trigonal $LiZr_2(PO_4)_3$, and TC-LZP shows the pattern of the JCPDS card of Triclinic $LiZr_2(PO_4)_3$.

Figure 3:
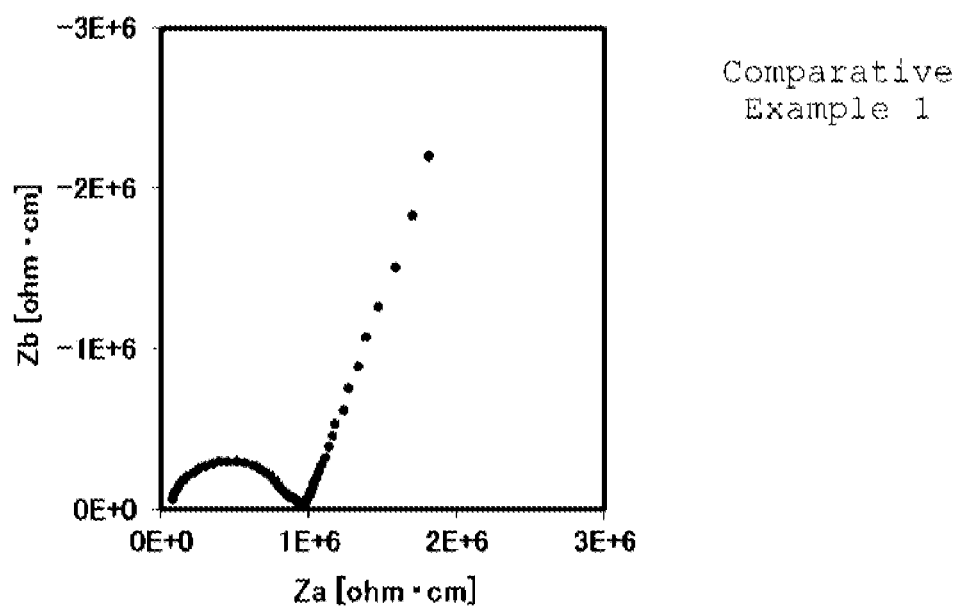
FIG. 3 is a cole-cole plot of the solid electrolyte prepared according to Example 1.
Figure 4:
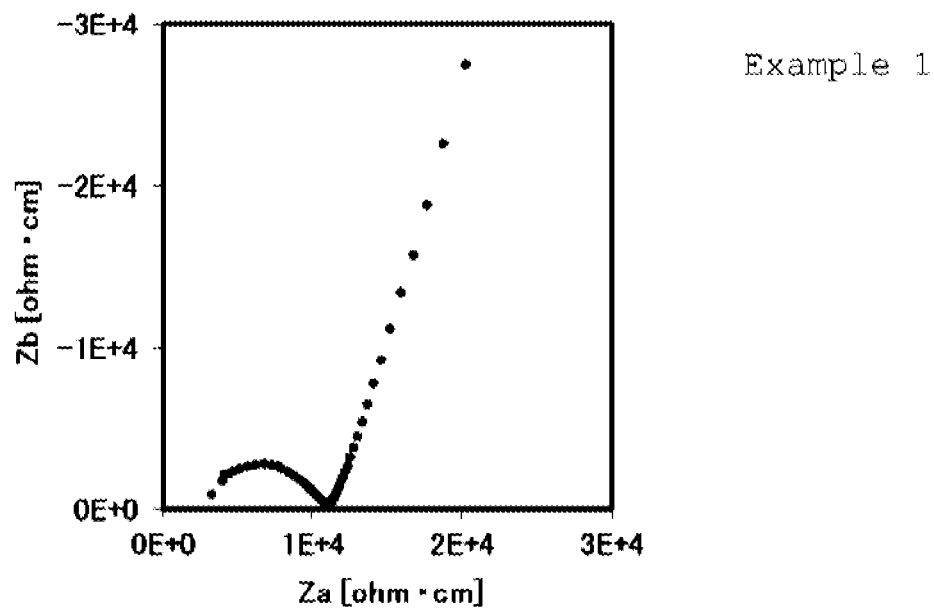
FIG. 4 is a cole-cole plot of the solid electrolyte prepared according to Comparative Example 1.
Figure 5:
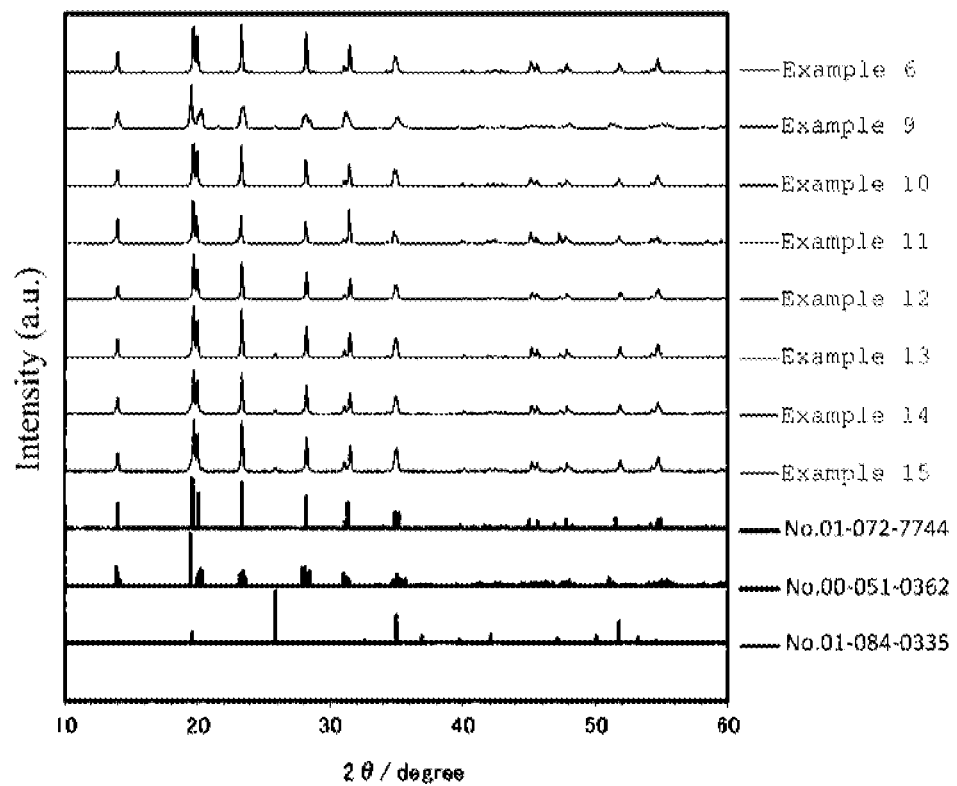
FIG. 5 is an X-ray diffraction chart for the solid electrolyte layers prepared according to each of Examples 9 to 15.

In addition, the cole-cole plot of the solid electrolyte prepared according to Example 1 is shown in FIG. 3.

$$\sigma=(t/A)\times(1/R)$$

σ: ionic conductivity
t: thickness of sample
A: area of electrode
R: resistance of solid electrolyte

TABLE 1

|  |  | M1 | M2 | a | b | c |
| --- | --- | --- | --- | --- | --- | --- |
| Comparative Example 1 | $LiZr_2(PO_4)_3$ | None | None | 0.00 | 0.00 | 0.00 |
| Example 1 | $Li_{1.06}Zr_{1.94}Y_{0.06}(PO_4)_3$ | Y | None | 0.06 | 0.06 | 0.06 |
| Example 2 | $Li_{1.12}Zr_{1.94}Ca_{0.08}(PO_4)_3$ | Ca | None | 0.12 | 0.06 | 0.06 |
| Example 3 | $Li_{1.16}Zr_{1.92}Mg_{0.08}(PO_4)_3$ | Mg | None | 0.16 | 0.08 | 0.08 |
| Example 4 | $Li_{1.20}Zr_{1.80}Sc_{0.02}(PO_4)_3$ | Sc | None | 0.20 | 0.20 | 0.20 |
| Example 5 | $Li_{1.00}Zr_{1.90}Ce_{0.10}(PO_4)_3$ | Ce | None | 0.00 | 0.10 | 0.10 |
| Example 6 | $Li_{1.06}Zr_{1.94}Y_{0.06}(PO_4)_3$ | Y | None | 0.06 | 0.06 | 0.06 |
| Example 7 | $Li_{1.12}Zr_{1.94}Ca_{0.06}(PO_4)_3$ | Ca | None | 0.12 | 0.06 | 0.06 |
| Example 8 | $Li_{1.16}Zr_{1.92}Ca_{0.08}(PO_4)_3$ | Mg | None | 0.16 | 0.08 | 0.08 |
| Example 9 | $Li_{1.01}Zr_{1.98}Y_{0.01}(PO_4)_3$ | Y | None | 0.01 | 0.01 | 0.01 |
| Example 10 | $Li_{1.02}Zr_{1.98}Y_{0.01}(PO_4)_3$ | Y | None | 0.02 | 0.02 | 0.02 |
| Example 11 | $Li_{1.01}Zr_{1.90}Y_{0.10}(PO_4)_3$ | Y | None | 0.10 | 0.10 | 0.10 |
| Example 12 | $Li_{1.20}Zr_{1.80}Y_{0.20}(PO_4)_3$ | Y | None | 0.20 | 0.20 | 0.20 |
| Example 13 | $Li_{1.22}Zr_{1.78}Y_{0.22}(PO_4)_3$ | Y | None | 0.22 | 0.22 | 0.22 |
| Example 14 | $Li_{1.38}Zr_{1.62}Y_{0.38}(PO_4)_3$ | Y | None | 0.38 | 0.38 | 0.38 |
| Example 15 | $Li_{1.40}Zr_{1.60}Y_{0.40}(PO_4)_3$ | Y | None | 0.40 | 0.40 | 0.40 |
| Example 16 | $Li_{1.07}Zr_{1.93}Y_{0.06}Al_{0.01}(PO_4)_3$ | Y | Al | 0.07 | 0.07 | 0.07 |
| Example 17 | $Li_{1.36}Zr_{1.64}Y_{0.06}Al_{0.30}(PO_4)_3$ | Y | Al | 0.36 | 0.36 | 0.36 |
| Example 18 | $Li_{1.06}Zr_{1.44}Y_{0.06}Ge_{0.50}(PO_4)_3$ | Y | Ge | 0.06 | 0.56 | 0.56 |
| Example 19 | $Li_{1.03}Zr_{0.97}Y_{0.03}Ti_{1.00}(PO_4)_3$ | Y | Ti | 0.03 | 1.03 | 1.03 |
| Example 20 | $Li_{1.05}Zr_{1.93}Y_{0.06}V_{0.01}(PO_4)_3$ | Y | V | 0.05 | 0.07 | 0.07 |
| Example 21 | $Li_{1.33}Zr_{1.07}Y_{0.03}Al_{0.30}Ge_{0.60}(PO_4)_3$ | Y | Al, Ge | 0.33 | 0.93 | 0.93 |
| Example 22 | $Li_{1.33}Zr_{0.87}Y_{0.03}Al_{0.30}Ge_{0.40}Ti_{0.40}(PO_4)_3$ | Y | Al, Ge, Ti | 0.33 | 1.13 | 1.13 |
| Example 23 | $Li_{1.31}Zr_{0.69}Y_{0.01}Al_{0.30}Ge_{0.50}Ti_{0.50}(PO_4)_3$ | Y | Al, Ge, Ti | 0.31 | 1.31 | 1.31 |

TABLE 1-continued

| | | | | c1 | c2 | XRD | Ionic conductivity ($\times 10^{-6}$ S/cm) |
|---|---|---|---|---|---|---|---|
| Example 24 | $Li_{1.41}Zr_{0.15}Y_{0.01}Al_{0.40}Ge_{0.40}Ti_{1.00}(PO_4)_3$ | Y | Al, Ge, Ti | 0.41 | 1.81 | | 1.81 |
| Example 25 | $Li_{1.11}Zr_{0.49}Y_{0.01}Al_{0.30}Ge_{0.50}Ti_{0.50}V_{0.20}(PO_4)_3$ | Y | Al, Ge, Ti, V | 0.11 | 1.51 | | 1.51 |

| | | c1 | c2 | XRD | Ionic conductivity ($\times 10^{-6}$ S/cm) |
|---|---|---|---|---|---|
| Comparative Example 1 | $LiZr_2(PO_4)_3$ | 0.00 | 0.00 | TG-LZP, TC-LZP | 1.0 |
| Example 1 | $Li_{1.06}Zr_{1.94}Y_{0.06}(PO_4)_3$ | 0.06 | 0.00 | TG-LZP, $YPO_4$ | 90.0 |
| Example 2 | $Li_{1.12}Zr_{1.94}Ca_{0.08}(PO_4)_3$ | 0.06 | 0.00 | TG-LZP, $CaZTGO_3$ | 130.0 |
| Example 3 | $Li_{1.16}Zr_{1.92}Mg_{0.08}(PO_4)_3$ | 0.08 | 0.00 | TG-LZP, $Mg_3(PO_4)_2$ | 70.0 |
| Example 4 | $Li_{1.20}Zr_{1.80}Sc_{0.02}(PO_4)_3$ | 0.20 | 0.00 | TG-LZP | 75.0 |
| Example 5 | $Li_{1.00}Zr_{1.90}Ce_{0.10}(PO_4)_3$ | 0.10 | 0.00 | TG-LZP, $CeO_{1.866}$ | 60.0 |
| Example 6 | $Li_{1.06}Zr_{1.94}Y_{0.06}(PO_4)_3$ | 0.06 | 0.00 | TG-LZP | 120.0 |
| Example 7 | $Li_{1.12}Zr_{1.94}Ca_{0.06}(PO_4)_3$ | 0.06 | 0.00 | TG-LZP | 210.0 |
| Example 8 | $Li_{1.16}Zr_{1.92}Ca_{0.08}(PO_4)_3$ | 0.08 | 0.00 | TG-LZP | 90.0 |
| Example 9 | $Li_{1.01}Zr_{1.98}Y_{0.01}(PO_4)_3$ | 0.01 | 0.00 | TG-LZP, TC-LZP | 73.0 |
| Example 10 | $Li_{1.02}Zr_{1.98}Y_{0.01}(PO_4)_3$ | 0.02 | 0.00 | TG-LZP | 92.0 |
| Example 11 | $Li_{1.01}Zr_{1.90}Y_{0.10}(PO_4)_3$ | 0.10 | 0.00 | TG-LZP | 120.0 |
| Example 12 | $Li_{1.20}Zr_{1.80}Y_{0.20}(PO_4)_3$ | 0.20 | 0.00 | TG-LZP | 98.0 |
| Example 13 | $Li_{1.22}Zr_{1.78}Y_{0.22}(PO_4)_3$ | 0.22 | 0.00 | TG-LZP, $YPO_4$ | 65.0 |
| Example 14 | $Li_{1.38}Zr_{1.62}Y_{0.38}(PO_4)_3$ | 0.38 | 0.00 | TG-LZP, $YPO_4$ | 49.0 |
| Example 15 | $Li_{1.40}Zr_{1.60}Y_{0.40}(PO_4)_3$ | 0.40 | 0.00 | TG-LZP, $YPO_4$ | 34.0 |
| Example 16 | $Li_{1.07}Zr_{1.93}Y_{0.06}Al_{0.01}(PO_4)_3$ | 0.06 | 0.01 | TG-LZP | 130.0 |
| Example 17 | $Li_{1.36}Zr_{1.64}Y_{0.06}Al_{0.30}(PO_4)_3$ | 0.06 | 0.30 | TG-LZP, $AlPO_4$ | 230.0 |
| Example 18 | $Li_{1.06}Zr_{1.44}Y_{0.06}Ge_{0.50}(PO_4)_3$ | 0.06 | 0.50 | TG-LZP | 360.0 |
| Example 19 | $Li_{1.03}Zr_{0.97}Y_{0.03}Ti_{1.00}(PO_4)_3$ | 0.03 | 1.00 | TG-LZP | 410.0 |
| Example 20 | $Li_{1.05}Zr_{1.93}Y_{0.06}V_{0.01}(PO_4)_3$ | 0.06 | 0.01 | TG-LZP | 81.0 |
| Example 21 | $Li_{1.33}Zr_{1.07}Y_{0.03}Al_{0.30}Ge_{0.60}(PO_4)_3$ | 0.03 | 0.90 | TG-LZP | 510.0 |
| Example 22 | $Li_{1.33}Zr_{0.87}Y_{0.03}Al_{0.30}Ge_{0.40}Ti_{0.40}(PO_4)_3$ | 0.03 | 1.10 | TG-LZP | 630.0 |
| Example 23 | $Li_{1.31}Zr_{0.69}Y_{0.01}Al_{0.30}Ge_{0.50}Ti_{0.50}(PO_4)_3$ | 0.01 | 1.30 | TG-LZP | 980.0 |
| Example 24 | $Li_{1.41}Zr_{0.15}Y_{0.01}Al_{0.40}Ge_{0.40}Ti_{1.00}(PO_4)_3$ | 0.01 | 1.80 | TG-LZP | 1700.0 |
| Example 25 | $Li_{1.11}Zr_{0.49}Y_{0.01}Al_{0.30}Ge_{0.50}Ti_{0.50}V_{0.20}(PO_4)_3$ | 0.01 | 1.50 | TG-LZP | 1300.0 |

It has been successfully confirmed that the $LiZr_2(PO_4)_3$ prepared according to Comparative Example 1 agrees with the card patterns of the NaSICON-type Trigonal $LiZr_2(PO_4)_3$ as a high ionic conduction phase and of the NaSICON-type Triclinic $LiZr_2(PO_4)_3$ as a low ion conduction phase. The ionic conductivity of the $LiZr_2(PO_4)_3$ prepared according to Comparative Example 1 was $1.0\times10^{-6}$ S/cm.

It has been successfully confirmed that the solid electrolytes with Zr partially substituted by Y, Ca, Mg, Sc, or Ce, prepared according to Examples 1 to 8, all agree with the card pattern of Trigonal $LiZr_2(PO_4)_3$, and any peak has not been confirmed which agrees with the card pattern of Triclinic $LiZr_2(PO_4)_3$.

In addition, in the solid electrolytes prepared according to Examples 1 to 3 and 5, a different phase was confirmed to an extremely small extent. The confirmed different phase has agreed with the card patterns of $YPO_4$, $Ca(ZrO_3)$, $Mg_3(PO_4)_2$, and $CeO_{1.866}$.

The value at the end of the right end of the arc of the cole-cole plot shown in FIG. 3 was regarded as the resistance (the sum of the particle resistance and the grain boundary resistance) of the solid electrolyte.

The solid electrolytes prepared according to Examples 1 to 5 were $0.7\times10^{-4}$ to $1.3\times10^{-4}$ S/cm in ionic conductivity, which were all higher in value as compared with unsubstituted $LiZr_2(PO_4)_3$.

The solid electrolytes prepared according to Examples 6 to 8 were $0.9\times10^{-4}$ to $2.1\times10^{-4}$ S/cm in ionic conductivity, which were also all higher in value as compared with unsubstituted $LiZr_2(PO_4)_3$.

From a comparison between the result of Example 1 and the result of Example 6, a comparison between the result of Example 2 and the result of Example 7, and a comparison between the result of Example 3 and the result of Comparative Example 8, it has been determined that a higher ionic conductivity can be obtained through the use of zirconia (partially stabilized zirconia) obtained by adding in advance, to $ZrO_2$, an additive element capable of stabilizing or partially stabilizing the crystal structure of $ZrO_2$ to stabilize the tetragonal or cubic crystal structure of the high-temperature phase.

It has been successfully confirmed that the solid electrolytes ($Li_{1+a}Zr_{2-b}M_c(PO_4)_3$) with Zr partially substituted, prepared according to Examples 9 to 15 all agree with the card pattern of NaSICON-type Trigonal $LiZr_2(PO_4)_3$ as a high ionic conduction phase.

In the solid electrolyte prepared according to Example 9, a different phase was confirmed to a small extent. The confirmed different phase has agreed with the card pattern of Triclinic $LiZr_2(PO_4)_3$. The cause of the different phase generation is believed to be the fact that due to the small amount of substitution element, there is a part where no NaSICON-type high ionic conduction phase can be formed stably.

Also, in the solid electrolytes prepared according to Examples 13 to 15, a different phase was confirmed to a small extent. The confirmed different phase has agreed with the card pattern of $YPO_4$.

The cause of the different phase generation is believed to be the fact that due to the large amount of substitution element, Y which has failed to serve as a solid solution in the NaSICON-type crystal structure forms a different phase.

It has been successfully confirmed that the solid electrolytes prepared according to Examples 16 to 25 all agree with the card pattern of NaSICON-type Trigonal $LiZr_2(PO_4)_3$ as a high ionic conduction phase.

In the solid electrolyte prepared according to Example 17, a different phase was confirmed to a small extent.

The confirmed different phase has agreed with the card pattern of $AlPO_4$. The reason why the different phase was confirmed is believed to be because that the substitution element Al partially failed to provide a solid solution, thereby forming a different phase.

DESCRIPTION OF REFERENCE SYMBOLS

1: all solid state battery
11: positive electrode
12: negative electrode
13: solid electrolyte layer

The invention claimed is:

1. A solid electrolyte having a NaSICON-type crystal structure, the solid electrolyte represented by:

$$Li_{1+a}Zr_{2-b}M1_{c1}M2_{c2}(PO_4)_3$$

wherein M1 is at least one element capable of stabilizing or partially stabilizing a tetragonal or cubic crystal structure of a high-temperature phase of $ZrO_2$, M2 is at least one element selected from the group of Al, Ga, Sc, In, Ge, Ti, Ru, Sn, Hf, Ce, V, Nb, Ta, Bi, and W, $-0.50 \leq a \leq 2.00$,
$0.01 \leq b \leq 1.90$,
$0.01 \leq c1 \leq 0.90$, and
$0.01 \leq c2 \leq 1.89$.

2. The solid electrolyte according to claim 1, wherein Li is partially substituted with at least one selected from the group of Na, K, Rb, Cs, Ag, and Ca.

3. The solid electrolyte according to claim 2, wherein P is partially substituted at least one of B and Si.

4. The solid electrolyte according to claim 1, wherein P is partially substituted at least one of B and Si.

5. An all solid state electrolyte battery comprising:
a solid electrolyte layer comprising the solid electrolyte according to claim 1;
a positive electrode joined to a first surface of the solid electrolyte layer; and
a negative electrode joined to a second surface of the solid electrolyte layer.

* * * * *